US010131969B2

(12) United States Patent
Bruck et al.

(10) Patent No.: US 10,131,969 B2
(45) Date of Patent: *Nov. 20, 2018

(54) METHOD TO FORM OXIDE DISPERSION STRENGTHENDED (ODS) ALLOYS

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/469,633

(22) Filed: Aug. 27, 2014

(65) Prior Publication Data

US 2016/0215364 A1 Jul. 28, 2016

(51) Int. Cl.
*C22C 1/10* (2006.01)
*B23K 26/34* (2014.01)
*B23K 15/00* (2006.01)

(52) U.S. Cl.
CPC ........ *C22C 1/1036* (2013.01); *B23K 15/0086* (2013.01); *B23K 26/34* (2013.01)

(58) Field of Classification Search
CPC ........ B33Y 10/00; B23K 26/34; B22Y 10/00; C22C 1/1036
See application file for complete search history.

(56) References Cited

U.S. PATENT DOCUMENTS

| 5,449,435 | A | 9/1995 | Funkhouser et al. | |
|---|---|---|---|---|
| 9,440,287 | B2 | 9/2016 | Bruck et al. | |
| 2013/0136868 | A1* | 5/2013 | Bruck | B05D 3/06 427/554 |
| 2013/0299470 | A1* | 11/2013 | Park | B23K 26/0081 219/121.66 |
| 2013/0334263 | A1* | 12/2013 | Morikawa | B22D 11/10 222/603 |
| 2014/0220374 | A1 | 8/2014 | Bruck et al. | |

OTHER PUBLICATIONS

Molian, P.A., et al., "Laser Welding of Oxide Dispersion-Strengthened Alloy MA754," Journal of Materials Science, 1992, 27, 2687-94.

* cited by examiner

*Primary Examiner* — Weiping Zhu

(57) ABSTRACT

Method for forming an oxide dispersion strengthened alloy. An alloy material (24) is melted with an energy beam (28) to form a melt pool (30) in the presence of a flux material (26), and particles (36) of a metal oxide are directed into the melt pool such that the particles are dispersed within the melt pool. Upon solidification, an oxide dispersion strengthened alloy (44) is formed as a layer bonded to an underlying substrate (20) or as an object contained on a removable support.

19 Claims, 1 Drawing Sheet

METHOD TO FORM OXIDE DISPERSION STRENGTHENDED (ODS) ALLOYS

FIELD OF THE INVENTION

This invention relates generally to the field of metal-component fabrication and repair, and more particularly to the formation of oxide dispersion strengthened (ODS) alloys.

BACKGROUND OF THE INVENTION

Oxide dispersion strengthened (ODS) alloys are recognized to possess superior properties for high temperature applications; especially ODS alloys formed of superalloy materials. ODS alloys are distinguished from conventional alloys by the presence of dispersoids of fine particles and by an elongated grain shape which generally develops during a recrystallization heat treatment and/or hot and cold working. This particular grain structure enhances the high temperature deformation characteristics of ODS alloys by inhibiting the accumulation of inter-granular damage. As result of this and other properties, components fabricated from ODS alloys exhibit improved high-temperature creep strength and improved oxidation resistance as compared to conventional alloys.

However, ODS alloys are very difficult to weld and repair by conventional techniques (e.g., gas tungsten arc welding, laser welding, electron beam welding, etc.). Such fusion welding causes significant loss of strength. The alloys are furthermore difficult and uneconomical to process by less traditional processes such as friction welding.

ODS alloys are typically produced by mechanical alloying (MA) processes in which various metals, alloys and oxides are blended and ball mill processed to impact, smear and shear the powders to create particles consisting of all constituents. The particles are then packaged and extruded, or hot isostatically pressed (HIP) to achieve a desired shape. The very fine-grained resulting product with small oxide particles dispersed as dispersoids and with directional stresses is then heat treated to recrystallize and grow large directional grains and/or is processed by additional hot and cold working. Further improved strength properties can then be obtained by performing a secondary recrystallization heat treatment. This heat treatment consists of annealing at a defined temperature, which depends on the composition of the alloy, to increase the size of grains in the alloy. A successful secondary recrystallization heat treatment causes abnormal grain growth to produce course, anisotropic grains having elongated shapes that resist slip at the grain boundaries.

Mechanical alloying suffers from a number of problems. First, the success of the heat treatment (secondary recrystallization) for one alloy specimen often does not guarantee success for another specimen—even for alloys having identical compositions. So, yield and predictability is poor. Another problem relates to the difficulty of dispersing certain oxides (such as yttria) which can lead to excessively long milling times or inhomogeneous microstructures. Furthermore, mechanical alloying is often not suitable for mass-produced and/or large-size products containing ODS alloys because of complicated manufacture procedures as well as prohibitively high costs. Nickel based ODS alloys are especially difficult to cold work and to successfully recrystallize.

Additional challenges associated with ODS alloys involve general shaping and joining of these materials. Shaping and joining techniques which preserve the microstructure and intrinsic strength of ODS alloys are severely limited, which often curtails their ability to be incorporated into high-temperature, load-bearing structures. For example, excessive heating of ODS alloys can cause the oxide dispersoids to coalescence leading to severe agglomeration such that the dispersoids may no longer be effective in resisting slip at the grain boundaries. Melting of ODS alloys also results in "slagging off" of the oxide dispersoids reducing their strengthening ability. Since most ODS alloys derive their strength from an elongated grain structure, such disruption of the grain structure ultimately reduces creep strength.

Various attempts have been made to discover alternative techniques for producing ODS alloys which avoid the disadvantages described above. Park et al. (US 2013/0299470), for example, describe a process illustrated in FIG. 1 in which a laser beam 6 is employed to heat the surface 4 of a metal sheet or tube 2 to form a metallic matrix melt 8. In this process a nozzle 10 is used to propel a jet of oxide particles 12 contained within an inert carrier gas 14 into the matrix melt 8 to form, upon cooling with a lubricant or coolant, an ODS alloy layer 16 containing oxide dispersoids 18 which is bonded to the metal sheet or tube 2.

Although the process of Park et al. avoids some of the problems associated with mechanical alloying, it is limited to the formation of ODS alloy coatings upon metallic objects (i.e., sheets or tubes) whose surfaces can be readily melted using a laser beam. This process also requires the use of a lubricant or coolant to cool the molten ODS alloy matrix, and requires the use of an inert gas (i.e., Ar or He) to inhibit oxidation of the ODS alloy during the cooling process.

Funkhouser et al. (U.S. Pat. No. 5,449,536) teach development of an ODS coating on a substrate by spraying the ODS powder into a "hot zone" created by a laser above the substrate. The substrate is not melted but the partially melted or plasticized powder impinges on and adheres to the substrate. Again, the process is limited to coatings on metal objects and an inert process environment would likely be required.

BRIEF DESCRIPTION OF THE DRAWINGS

The invention is explained in the following description in view of the drawings that show.

DETAILED DESCRIPTION OF THE INVENTION

The present Inventors have recognized that a need exists to discover methods for forming ODS alloys which avoid the disadvantages described above. An optimal method would allow both small-scale and large-scale formation of ODS alloys without the need to perform post-welding heat treatment or to use rigorously air-free conditions. Such a method would also provide an enhanced ability to control the distribution and characteristics of oxide particles contained in the ODS alloys, and to produce optimal grain shape and structure without performing secondary recrystallization heat treatment.

Disclosed herein are methods for forming oxide dispersion strengthened (ODS) alloys, in which oxide particles are injected into a molten pool of metallic material generated by an energy beam optionally in the presence of a flux material. The size and distribution of oxide particles contained in the resulting ODS alloys can be varied by controlling a number of factors including the melting point, size and trajectory of the oxide particles, as well as the shape, duration and intensity of heat imparted by the energy beam. Use of flux materials can avoid the necessity to conduct these methods under rigorously air-free conditions, and can unexpectedly provide ODS alloys having desirable elongated grain structures without requiring secondary recrystallization heat treatment. The grain structure of the resulting alloys may also be engineered through directional solidification using refractory materials having different thermal conductivities. Such methods may be applied to the fabrication and repair of ODS alloys in a variety of contexts, and may also be applied to the production of bulk ODS alloys whose mechanical properties can be precisely controlled.

Figure 2:
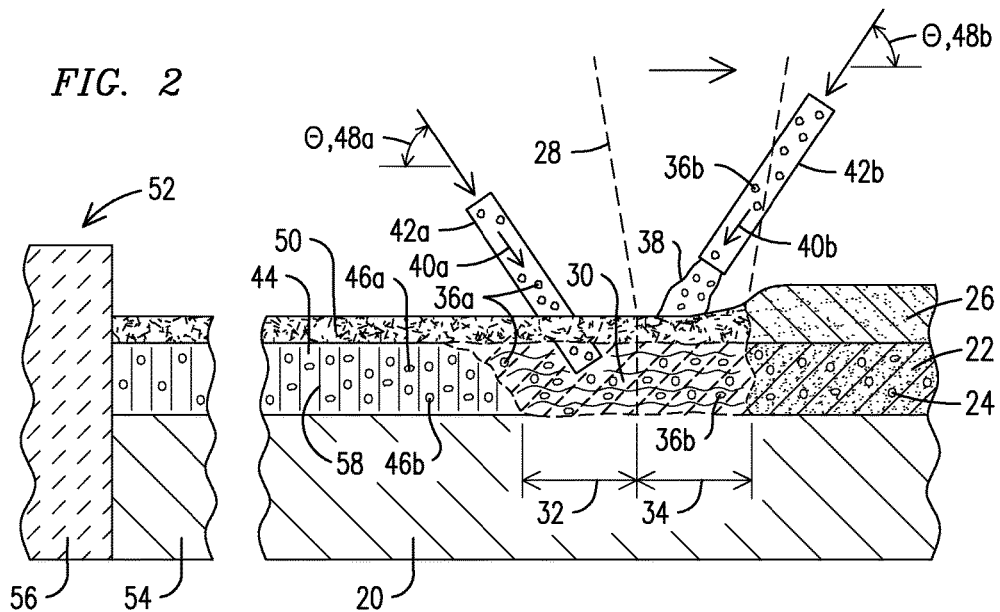
FIG. 2 illustrates laser melting processes for producing ODS alloys from a powdered filler material in the presence of a flux material.

FIG. 2 depicts an exemplary method of the present disclosure which is applicable to various embodiments. In this illustration a filler material 22 containing alloy particles 24 is deposited onto the surface of a support material 20. An energy beam 28 is then traversed (shown in FIG. 2 moving from left to right) across the surface of the filler material 22 to melt the filler material 22 and thereby form a melt pool 30 containing a molten matrix of the alloy. As shown in FIG. 2, the melt pool 30 encompasses a heating portion 34 located under the focal point of the energy beam 28 and a non-heating portion 32 located behind the focal point of the energy beam 28. It will be appreciated that a temperature of the melt pool 30 in the heating portion 34 is generally greater than a temperature of the melt pool 30 in the non-heating portion 32.

In the embodiment of FIG. 2, an injection nozzle 42a is used to inject oxide particles 36a contained within a propellant gas 40a into the non-heating portion 32 of the melt pool 30 such that the oxide particles 36a are not contacted by the energy beam 28. The oxide particles 36a may also be directed into the heating portion 34 of the melt pool 30, or into both the heating portion 34 and the non-heating portion 32—such that the oxide particles 36 are contacted by the energy beam 28. The outlet of the injection nozzle 42a may be immersed within the melt pool 30 as shown in FIG. 2. In some embodiments the use of such direct injection improves uniformity of the molten oxide dispersion, leading to improved mechanical and/or thermal properties in the resulting ODS alloy layer 44.

Injection nozzles 42a used to directly inject particles into the melt pool 30 may be in the form of hollow nozzles containing refractory materials such as ceramics (e.g., $ZrO_2$), carbides (e.g. WC), nitrides (e.g., BN) and graphite. In other embodiments the direct injection nozzle 42a may be in the form of a consumable cored injector. One non-limiting example employs a consumable cored injector containing a cored wire made of a nickel or a nickel alloy sheath surrounding a powdered core material containing at least the oxide particles (e.g., particles 36a). The consumable cored injector is fed into the melt pool 30 causing the metallic sheath to melt because it is of a relatively low melting point. The powdered core material is then distributed into the melt pool 30 to form the dispersed oxide particles 46a, 46b. In some embodiments employing a consumable cored injector, the cored injector 42a may be preheated and/or oscillated within the melt pool further heating the melt pool and/or distributing the oxide particles 36a. In some cases the powdered cored material may contain both the oxide particles 36a and a flux material.

Alternatively, as illustrated in FIG. 2, the outlet of an injection nozzle 42b may be positioned above the melt pool 30, such that a stream 38 of oxide particles 36b contained in a propellant gas 40b is directed into the melt pool 30 by penetrating the surface of the heating and/or non-heating portion 32, 34. When more than one nozzle 42a,b is employed, the oxide particles 36a and 36b may be the same or different (in terms of their contents and/or sizes), and the propellant gases 40a and 40b may also be the same or different.

In the illustration of FIG. 2, a flux material 26 may be deposited onto the surface of the filler material 22 and, upon melting by the energy beam 28, generally forms a resulting slag layer 50 which coats the surface of the ODS alloy layer 44. The flux material 26 may be deposited as a separate layer as shown in FIG. 2, or it may be continuously fed onto the filler material 22 upstream of the melt pool 30, or it may be mixed within the filler material 22. The flux material 26 may also be directed into the melt pool 30 by using one or more nozzles 42a,b in which the flux material may be either directly injected (as shown with nozzle 42a) or may be directed to penetrate the surface of the melt pool 30 (as shown with nozzle 42b). In such cases the flux material may be directed into one or both of the non-heating and heating portions 32, 34 of the melt pool 30.

Upon cooling and solidification of the melt pool 30, an ODS alloy layer 44 containing dispersed oxide particles 46a (and optionally 46b) is formed.

The content, size, shape and distribution of the oxide particles 46a,b contained in the resulting ODS alloy layer 44 can be controlled by adjusting various parameters including: (i) the content, size, concentration and trajectory of the oxide particles 36a,b injected or directed into the melt pool 30; and (ii) the intensity, duration and shape of heating by the energy beam 28. The grain structure of the ODS alloy layer 44 can also be controlled by adjusting various parameters including: (iii) the metal content of the alloy; (iv) the content, amount and trajectory of the flux material 26; and (v) the placement and thermal characteristics of the support material 20.

The oxide particles 36a,b are generally contain at least one metal oxide having a higher melting point than the metallic base alloy of the ODS alloy layer 44. Suitable metal oxides include oxides of elements such as aluminum, calcium, hafnium, silicon, titanium, thorium, yttrium and zirconium, to name a few. Mixtures of oxide particles 36a,b containing different metal oxides and/or having different particle sizes may be used. Pre-formed ODS alloys may also be used as the oxide particles 36a,b. As explained above, the oxide particles 36a,b may be injected directly into the melt pool 30 (via a refractory nozzle and/or via a consumable cored injector as shown with nozzle 42a) avoiding contact with the atmosphere, or may be directed into the melt pool 30 from above (as shown with nozzle 42b)

The size of the dispersed oxide particles 46a,b (commonly referred to as "dispersoids") embedded in the resulting ODS alloy layer 44 is related to three factors.

First, the size of the dispersoids 46a,b is directly related to the melting point of the precursor metal oxide 36a,b—such that the use of an oxide particle 36a,b having a relatively higher melting point produces relatively larger dispersoids 46a,b for a certain particle size. By illustration, when a mixture of silica and yttria particles of equivalent size is injected into the non-heating portion 32 of the melt pool 30, the resulting ODS alloy layer 44 generally contains a mixture of relatively larger yttria dispersoids and relatively smaller alumina dispersoids. This variation in the size of the resulting dispersoids occurs because alumina has a significantly lower melting point (2,072° C.) as compared to yttria (2425° C.)—allowing a larger proportion of the alumina particles to melt and dissolve into the matrix of the ODS alloy. This effect allows modulation of dispersoid size by altering the melting point of a metal oxide contained in the oxide particles 36a,b.

Second, the size of the resulting dispersoids 46a,b is directly related to the size of the precursor oxide particles 36a,b. For example, when a mixture of relatively small and large yttria particles is injected into the non-heating portion 32 of the melt pool 30, the resulting ODS alloy layer 44 generally contains a mixture of relatively large yttria dispersoids (corresponding to the larger oxide particles) and relatively small yttria dispersoids (corresponding to the smaller oxide particles). This effect allows modulation of dispersoid 46a,b size in the ODS alloy layer 44 by altering the size of the precursor oxide particles 36a,b.

Third, the size of the resulting dispersoids 46a,b is directly related to the intensity and duration of heat applied to the oxide particles 36a,b and/or to the melt pool 30 by the energy beam 28. For example, when oxide particles 36a of a particular size and melting point are injected into the non-heating portion 32 of the melt pool 30, the size of the resulting dispersoids 46a in the ODS alloy layer 44 is generally larger than dispersoids 46b resulting when the same oxide particles 36b are directed into the heating portion 34 of the melt pool 30. This variation in size may occur because oxide particles 36b directed into the heating portion 34 of the melt pool 30 receive more heat in the form of: (i) direct contact with the energy beam as the stream 38 passes through the energy beam in flight; and/or (ii) relatively higher temperatures which occur in the heating portion 34 of the melt pool 30 as compared to the non-heating portion 32.

This effect allows modulation of the dispersoid size by altering the trajectory of the corresponding oxide particles 36a,b (e.g., directing or injecting oxide particles into relatively hotter or cooler portions of the melt pool 30, with or without direct contact with the energy beam). This effect also allows the size of dispersoids resulting from different oxide particles to be altered or normalized (e.g., closely matched) by employing different trajectories depending upon the respective melting points and/or sizes of the oxide particles. For example, an ODS alloy layer 44 containing dispersoids 46a,b of alumina and yttria having similar sizes may be obtained in spite of the different melting points of the corresponding metal oxides by injecting or directing the alumina-containing particles 36a into the non-heating portion 32 while injecting or directing the yttria-containing particles 36b into the heating portion 34. The angles 48a,b of the nozzles 42a,b are another factor that can be used to modulate the heating to the oxide particles 36a,b in the melt pool 30. Reducing the angle 48a, for instance, causes the oxide particles 36a to be directed into increasingly hotter regions of the melt pool 30 as shown in FIG. 2.

The size, shape and distribution of the oxide particles 36a,b may also be altered by modulating the intensity, duration and shape of the energy beam 28. As explained above, applying more heat to the oxide particles 36a,b causes a higher proportion of melting which can reduce the size of the resulting dispersoids 46a,b and potentially affect their shape in the resulting metallic matrix. Excessive heating may also lead to coalescence or slagging off of dispersoids 46a,b adversely affecting the distribution of oxides within the resulting ODS alloy layer 44. Thus, optimal size, shape and distribution of the dispersoids 46a,b may be attained in part by adjusting heat energy applied by the energy beam (intensity and duration) as well as the size of the area heated (shape).

The term "energy beam" is used herein in a general sense to describe a relatively narrow, propagating stream of particles or packets of energy. An energy beam 28 as used in this disclosure may include a light beam, a laser beam, a particle beam, a charge-particle beam, a molecular beam, etc. which upon contact with a material imparts kinetic (thermal) energy to the material.

In some embodiments the energy beam 28 is a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, a pulsed (versus continuous wave) laser beam, etc. The rectangular shape may be particularly advantageous for embodiments having a relatively large area to be melted. In some embodiments the intensity and shape of the energy beam 28 are precisely controlled by employing laser scanning (rastering) optics to form a weld pool 30 having a precisely defined size and shape to accommodate the trajectory of the incoming oxide particles 36a,b. For example, such laser scanning enables a perimeter of the oxide particles 36b directed into the melt pool 30 to fit within a perimeter of the melt pool 30.

In certain embodiments the factors described above are adjusted such that only the surfaces of the oxide particles 36a,b are melted. Such surface melting (as opposed to complete melting) of the oxide particles 36 generally ensures that the resulting dispersoids 46a,b are adequately bonded to the matrix structure of the ODS alloy layer 44—while still maintaining optimal shape and mechanical integrity of the original oxide particles 36a,b to maximize the strength and thermal characteristics of the resulting ODS alloy.

The distribution of the dispersoids 46a,b in the ODS alloy layer 44 can also be controlled by altering both the velocity and concentration of oxide particles 36a,b injected and/or directed into the melt pool 30, and by rastering the energy beam 28 to generate currents of molten material in the melt pool 30. Increasing either the velocity or the concentration of the oxide particles 36a,b fired into the melt pool 30 generally increases the proportion of dispersoids 46a,b contained in the resulting ODS alloy layer 44. Increasing velocity can also provide a more uniform distribution when the melt pool 30 is especially viscous. In some embodiments laser scanning (rastering) is also used to generate currents of molten material within the melt pool 30 (e.g., the Marangoni effect) which can further distribute the oxide particles 36a,b throughout the melt pool 30.

As explained above, the grain structure of the ODS alloy layer 44 can be altered by adjusting various parameters including the metal content of the alloy. The filler material 22 is often used in a powder form and contains alloy particles 24 which at least partly define the composition of the resulting ODS alloy layer 44. The ODS alloy layer 44 may consist of a high-temperature metal matrix such as iron aluminide, iron chromium, iron-chromium-aluminum, nickel chromium and nickel aluminide to name a few. In certain applications the ODS alloy layer 44 consists of a superalloy metal matrix having a base alloying element of nickel, cobalt or nickel-iron, as well as other superalloy materials.

The term "superalloy" is used herein as it is commonly used in the art, i.e., a highly corrosion and oxidation resistant alloy that exhibits excellent mechanical strength and resistance to creek at high temperatures. Examples of superalloys include alloys sold under the trademarks and brand names Hastelloy, Inconel alloys (e.g., IN 738, IN 792, IN 939), Rene alloys (e.g., Rene N5, Rene 80, Rene 142), Haynes alloys (e.g., NS-163), Mar M, CM 247, CM 247 LC, C263, 718, X-750, ECY 768, X45, PWA 1483 and CMSX (e.g., CMSX-4) single crystal alloys.

While embodiments of this disclosure enable the formation of ODS superalloys (e.g., MA 956, MA 957, MA 754, MA 758, MA 760, MA 6000, PM 1000, PM 2000, PM 3030, ODM 751), the present method is not confined to such materials and may also be applied to other alloys such as thoriated tungsten, thoriated nickel, aluminium-based alloys, lithium based alloys, aluminum titanium, AlMgLi, AlSiC, NiTiC, FeNdB, 9Cr ferritic-martensitic steel, 18Cr ferritic steel, $CuAl_2O_3$, CuWC, and $CuZrO_2$, to name a few.

In some embodiments the metallic composition of the ODS alloy layer 44 is provided by both the alloy particles 24 and by additional metallic components either separately contained in the filler material 22 or separately fed or directed into the melt pool 30. For example, additional metallic components may be directly injected (e.g., via nozzle 42a) and/or streamed (e.g., via nozzle 42b) into the melt pool to supplement the metallic composition of the filler material 22. In other cases the metallic composition may be supplemented by metals contained in the oxide particles 36a,b (e.g., via melting of low-melting-point oxides). In other examples the metallic composition may be supplemented by metals contained in at least one flux material. In still other embodiments the metallic composition may be supplemented by metal contained in a consumable cored injection (e.g., contained in a metallic sheath).

In some embodiments the composition of the ODS alloy layer 44 is adapted to function as a bond coating or as a thermal barrier coating. The terms "bond coating" and "thermal barrier coating" are used herein as they are commonly used in the art. For example, the filler material 22 and the oxide particles 24 may be chosen such that the resulting ODS alloy layer 44 contains an MCrAlY alloy (where M is selected from Ni, Co, Fe and mixtures thereof, and Y is selected from Y, La and Hf) suitable for use as a bond coat. Alternately, the filler material 22 and the oxide particles 24 may be chosen such that the resulting ODS alloy layer 44 includes ceramic materials such as zirconia and yttria, and is suitable for use as a thermal barrier coating.

The flux material 26 and the resultant slag layer 50 provide a number of functions that are beneficial to ODS alloys of the present disclosure.

First, they function to shield both the melt pool 30 and the solidified (but still hot) ODS alloy layer 44 from the atmosphere. The flux material 26 may be formulated to produce a shielding gas in some embodiments, thereby avoiding or minimizing the use of vacuum conditions or expensive inert gas. The shielding gas may be a reducing gas, such as hydrogen, which reduces oxidation of the molten or cooling metal. The slag 50 floats to the surface of the weld pool 30 to further separate the molten or hot metal from the atmosphere. Due to the shielding effects of the flux material 26 and the resultant slag 50, in certain embodiments the method may be carried out under an oxygen-containing atmosphere—as opposed to the use of inert gas and/or vacuum conditions. In this regard the propellant gas 40a,b may be selected from inert gases such as nitrogen, argon and helium or from oxygen-containing gases including air and gaseous mixtures (e.g., lower grade inert gases) containing significant quantities (e.g., greater than 5% by volume) of oxygen. In some embodiments the propellant gas 40a,b is an inert gas (e.g., argon, helium, nitrogen) but the melting/solidification method may be performed under an oxygen-containing atmosphere.

Second, the slag layer 50 acts as a blanket allowing the solidified ODS alloy layer 44 to cool slowly and evenly—thereby reducing residual stresses that can contribute to post-weld reheat cracking and strain age cracking. This blanketing effect also improves the mechanical properties of the resulting ODS alloy by allowing more time for the ODS alloy layer 44 to cool and, thereby, forming unexpectedly elongated grains. Use of flux materials leading to the slag layer 50 in some embodiments also unexpectedly increases mechanical strength of the ODS alloy layer 44 without the need to perform a secondary recrystallization heat treatment—presumably due to the insulating effect of the slag layer 50.

In some embodiments the grain structure of the resulting ODS alloy layer 44 can be adjusted by controlling the content, form and amount of the flux material 26.

Choosing flux materials resulting in a slag layer 50 of relatively lower thermal conductivity reduces the rate of cooling of the ODS alloy layer 44, which provides additional time for the secondary recrystallization to produce anisotropic grains having elongated shapes that ultimate resist slip at grain boundaries (thereby improving high-temperature creep strength). Suitable flux materials include commercially available flux materials used in laser welding applications. Flux materials containing, for example, higher proportions of refractive substances such as zirconia can result in a lower thermal conductivity slag layer 50 improving the creep strength of the resulting ODS alloys.

The form of the flux material may also be controlled by, for example, grinding the flux material into smaller particle sizes to increase the density of the resulting flux powder. In some embodiments it is advantageous to grind the flux materials into powders having average particles sizes ranging from 0.02 mm to 0.08 mm (22-88 microns).

The amount of flux material applied to the filler material 22 and/or the melt pool 30 also affects the grain structure. Increasing the amount of the flux material 26 increases the thickness of the resulting slag layer 50. In some embodiments in which a powdered flux material 26 is deposited onto the surface of the filler material 22, a thickness of the powdered flux material 26 ranges from 3 mm to 20 mm. In other embodiments the thickness ranges from 5 mm to 13 mm. The amount of the flux material 26 may also be modulated based upon the thickness of the resulting slag layer 50. For example, in some cases the amount of the flux material 26 is adjusted so that a thickness of the resulting slag layer 50 ranges from 1 mm to 10 mm. In other embodiments the thickness of the slag layer 50 is adjusted to range from 2 mm to 5 mm.

Third, the slag layer 50 helps to shape the melt pool 30 to keep it close to a desired height-to-width ratio. In some cases the desired height-to-width ratio ranges from 1:2 to 1:4. In other embodiments the desired height-to-width ratio is about 1:3.

Fourth, the flux material 26 provides a cleansing effect for removing trace impurities such as sulfur and phosphorous which contribute to weld solidification cracking. Such cleansing includes deoxidation of the alloy particles 24 in the filler material 22, as well as deoxidation of metallic components of the melt pool 30.

Fifth, the flux material 26 can provide an energy absorption and trapping function to more effectively convert the energy beam 28 into heat energy, thus facilitating a more precise control of heat input and a resultant tight control of temperatures within both the non-heating and the heating portions 32,34 of the melt pool 30.

Finally, the flux material 26 may be formulated to compensate for loss of volatized elements (e.g., Ti evaporated as $TiO_2$) during processing, or to actively contribute elements to the melt pool 30 that are not otherwise contained within the filler material 22.

Following cooling and solidification of the melt pool 30, the resulting slag layer 50 can be removed using physical and/or chemical methods known in the relevant art.

The illustrative method depicted in FIG. 2 may be adapted to perform a wide variety of processes involving the formation of ODS alloy materials. These include the formation and repair of ODS alloy coatings on metallic substrates, and the production of bulk ODS alloys (not attached to a metallic substrate) which may be processed into various forms such as sheets, ingots and powders.

In some embodiments the support material 20 is a metallic substrate, such that the resulting ODS alloy layer 44 is deposited onto the surface of the metallic substrate to form an ODS cladding layer. Suitable metallic substrates include all metallic materials known in the art to be compatible with ODS alloys, including alloys in which the matrix is generally based on nickel, cobalt, chromium, platinum, rhodium or iron. In some instances the support material 20 and/or the ODS alloy layer 44 may contain a superalloy material based on nickel, cobalt or nickel-iron. The surface of the support material 20 (to which the resulting ODS alloy layer 44 is applied) may also be in the form of a pre-existing ODS alloy layer to form multi-layer ODS alloy materials. In such instances at least a portion of the pre-existing ODS alloy layer is melted such that the resulting ODS alloy layer 44 is bonded to the pre-existing ODS alloy layer.

Repair processes may include the joining of structures containing ODS alloys or the repair of damaged or worn ODS alloys. In such repairs the surface of the support material 20 (e.g., a superalloy object) may be ground down to remove defects and then cleaned using methods known in the art, prior to performing laser deposition of the ODS alloy layer 44 according to the present disclosure.

Bulk ODS alloys may also be prepared using the present methods (such as that depicted in FIG. 2) by employing a fugitive support as the support material 20. The term "fugitive" means removable after formation of the ODS alloy layer 44. Such removal may occur, for example, using direct (physical) removal, mechanical processes, fluid washing, chemical leaching and/or by any other known process capable of removing applicable fugitive support materials. The fugitive support material 20 may contain a refractory material such that the resulting ODS alloy layer 44 can be readily removed from the support material upon solidification and cooling. One non-limiting example of a suitable refractory support material 20 is a crucible and for example a crucible made of zirconia.

In these embodiments the filler material 22 is deposited or fed onto the surface of the fugitive support material 20, and then a laser deposition method of the present disclosure is performed optionally in the presence of a flux material 26 to produce an ODS alloy layer 44 situated on the fugitive support material 20. Following deposition of one or more layers 44, the fugitive support material 26 may be removed to reveal an object containing the ODS alloy whose shape and grain structure is determined in part by the shape and composition of the fugitive support material 26.

Many forms of the fugitive support material 26 may be employed as long as the material is capable of supporting all three of the filler material 22, the melt pool 30 and the ODS alloy layer 44, and is then removable from the ODS alloy layer 44. In some embodiments the fugitive support material is in the form of a bed of an oxide-containing material (e.g., zirconia) or in the form of a flux material. In some cases it is advantageous to employ a bed of a powdered oxide-containing material or a powdered flux—such that particle sizes in the fugitive support material 26 are less than particle sizes in the filler material 22. Such an arrangement can reduce or minimize intrusion of the melt pool 30 into the bed of the fugitive support material 26. In other cases the fugitive support material 20 is in the form of a refractive container (e.g., a crucible or a mold) adapted to control the shape and optionally the grain structure of the resulting ODS alloy 44.

Bulk ODS alloys prepared by methods of the present disclosure benefit from an ability to precisely control the content, size, shape and distribution of the resulting oxide dispersoids 46a,b as explained above. Furthermore, use of flux materials 26 permits fabrication of some bulk ODS alloys without the need for vacuum conditions or the use of inert atmospheric conditions. In some embodiments bulk ODS alloys may be prepared in the presence of significant quantities of atmospheric oxygen. In some cases bulk ODS alloys may be prepared such that at least one of the propellant gases 40a,b contains some proportion of oxygen or consists of air. Surprisingly, the presence of flux materials 26 in the melt pool 30 (and the resulting slag layer 50) may produce bulk ODS alloys having optimal (elongated) grain structure without the need for secondary recrystallization heat treatment. Addition heat treatment may optionally be performed to further improve the mechanical properties of bulk ODS alloys prepared by methods of the present disclosure.

Bulk ODS alloys prepared by methods of the present disclosure also benefit from an ability to control the grain structure of the resulting ODS alloy layer 44 through directional solidification. FIG. 2 also depicts the optional use of a solidification mold 52 (left-hand portion shown) containing a mold bottom portion 54 and a mold side portion 56. Selecting refractive materials of relatively low or high thermal conductivity allows directional control of heat transfer during cooling of the formed ODS alloy layer—such that the resulting ODS alloy layer 44 may contain either uniaxial (columnar) or equiaxed grain structures. For example, in the non-limiting illustration of FIG. 2 the mold bottom portion 54 may be constructed of a high thermal conductivity material (e.g., graphite) and the mold side portion 56 may be constructed of a low thermal conductivity material (e.g., zirconia), which causes directional solidification to produce uniaxial (columnar) grains 58 oriented perpendicular to the plane of the mold bottom portion 54. By controlling the thermal conductivity of the bottom and side portions 54,56 of the refractive solidification mold 52 the grain structure of the resulting ODS alloy layer 44 can be customized and varied. Directional solidification can also be affected by employing at least one chill plate (not shown in FIG. 2) situated to contact the mold bottom portion 54 and/or the mold side portion 56.

Figure 1:
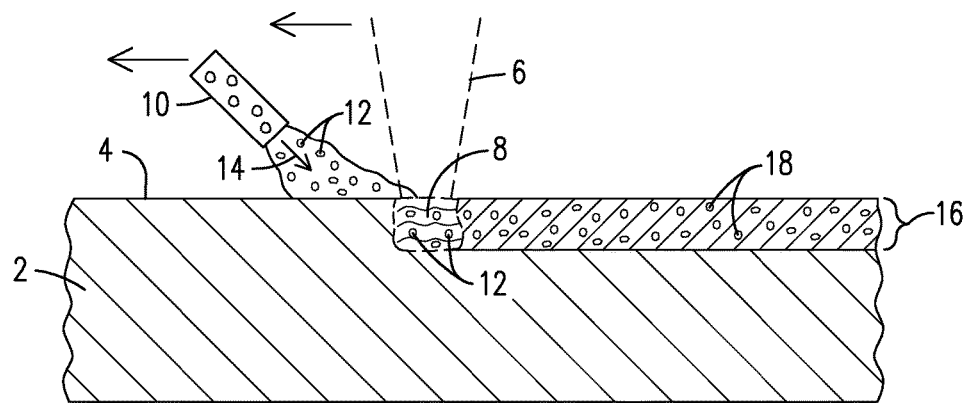
FIG. 1 illustrates a prior art laser melting process for producing an ODS alloy layer upon a surface of a metallic substrate.

Some embodiments of the present disclosure exclude the use of the filler material and instead use the energy beam 6 to directly melt the surface of a metallic substrate 2 to form the melt pool 8, as shown in FIG. 1. In such embodiments the melt pool 8 may be formed in the presence of a flux material 26 either deposited on the surface 4 of the metallic substrate 2 or directed into the melt pool 8 using a nozzle 42a,b. In such cases a resulting slag layer 50 provides the same benefits described above. The resulting ODS alloy layer 16 is thereby bonded to the metallic substrate 2.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
   melting an alloy material with an energy beam to form a melt pool in the presence of a flux material;
   directing particles comprising a metal oxide into the melt pool, such that the particles are dispersed within the melt pool;
   altering a trajectory of the metal oxide particles directed into the melt pool depending upon at least one of the size and the melting point of the metal oxide particles; and
   allowing the melt pool to cool and solidify to form an oxide dispersion strengthened alloy layer at least partially covered by a slag layer,
   wherein size and distribution of the dispersed metal oxide particles contained in the oxide dispersion strengthened alloy layer is controlled by adjusting a parameter comprising melting point of the metal oxide particles, size of the metal oxide particles, intensity of heat imparted by the energy beam, shape of heat imparted by the energy beam, and duration of heat imparted by the energy beam, wherein the particles are directed into the melt pool through a refractory injection nozzle that penetrates the slag layer.

2. The method of claim 1, further comprising depositing a powdered filler material comprising the alloy material onto a surface of a metallic substrate, such that upon cooling of the melt pool the oxide dispersion strengthened alloy is bonded to the surface of the metallic substrate.

3. The method of claim 2, wherein:
   the powdered filler material further comprises the flux material; or
   the powdered filler material is covered by a layer of the flux material.

4. The method of claim 1, further comprising:
   depositing a powdered filler material comprising the alloy material onto a fugitive support material, such that upon cooling of the melt pool the oxide dispersion strengthened alloy solidifies upon the fugitive support material; and
   removing the fugitive support material to obtain an object comprising the oxide dispersion strengthened alloy.

5. The method of claim 4, wherein:
   the fugitive support material is a bed comprising an oxide-containing material or a flux material; or
   the fugitive support material is a container comprising a refractory material.

6. The method of claim 4, wherein:
   the powdered filler material further comprises the flux material; or
   the powdered filler material is covered by a layer of the flux material.

7. The method of claim 4, wherein the fugitive support material is a refractive container comprising bottom and side portions comprising refractive materials.

8. The method of claim 7, wherein the refractive materials of the refractive container are selected to affect directional cooling of the melt pool such that the oxide dispersion strengthened alloy comprises uniaxial grains.

9. The method of claim 1, comprising melting a surface of a metallic substrate comprising the alloy material with the energy beam to form the melt pool, such that upon cooling of the melt pool the oxide dispersion strengthened alloy is bonded to the metallic substrate.

10. The method of claim 1, wherein the particles are directed into a non-heating portion of melt pool such that the particles are not contacted by the energy beam.

11. The method of claim 1, comprising:
    injecting particles comprising a first metal oxide into a non-heating portion of the melt pool through the refractory injection nozzle that penetrates the slag layer; and
    directing particles comprising a second metal oxide into a heating portion of the melt pool through a nozzle situated above the melt pool such that the particles comprising the second metal oxide are contacted by the energy beam.

12. The method of claim 1, wherein the particles are directed into the melt pool with at least one propellant gas selected from the group consisting of air, argon, nitrogen and helium.

13. The method of claim 1, wherein the metal oxide is an oxide of at least one element selected from the group consisting of aluminum, calcium, hafnium, silicon, titanium, thorium, yttrium and zirconium.

14. The method of claim 1, wherein the melting occurs by rastering a laser beam across a surface of a powdered filler material comprising the alloy material such that at least one of the following is satisfied:
    a perimeter of the particles directed into the melt pool fits within a perimeter of the melt pool; and
    the rastering of the laser beam generates currents of molten material within the melt pool which distributes the particles within the melt pool.

15. A method for producing an oxide dispersion strengthened alloy, the method comprising:
    placing a powdered superalloy material into a container comprising a bottom portion comprising a first refractory material and a side portion comprising a second refractory material;
    laser melting the powdered superalloy material in the presence of a flux material to form a melt pool covered by a slag layer;
    directing particles comprising a metal oxide into the melt pool through at least one injection nozzle or via a consumable cored injector;
    altering a trajectory of the metal oxide particles directed into the melt pool depending upon at least one of the size and the melting point of the metal oxide particles; and
    allowing the melt pool to cool and solidify to form an oxide dispersion strengthened alloy layer covered by the slag layer,
    wherein a thermal conductivity of the first refractory material is different than a thermal conductivity of the second refractory material, and
    wherein size and distribution of the dispersed metal oxide particles contained in the oxide dispersion strengthened alloy layer is controlled by adjusting a parameter comprising melting point of the metal oxide particles, size of the metal oxide particles, intensity of heat imparted by the energy beam, shape of heat imparted by the energy beam, and duration of heat imparted by the energy beam.

16. The method of claim 15, comprising:
   injecting the particles into a non-heating portion of the melt pool through an injection nozzle penetrating the slag layer, wherein the injection nozzle comprises at least one refractory material selected from the group consisting of a metal oxide, a metal carbide, a metal nitride and a graphite; or
   directing the particles into the non-heating portion of the melt pool via a consumable cored injector penetrating the slag layer, wherein the consumable cored injector comprises a nickel-containing sheath surrounding a powdered core material comprising the particles.

17. The method of claim 15, wherein the metal oxide is an oxide of at least one element selected from the group consisting of aluminum, calcium, hafnium, silicon, titanium, thorium, yttrium and zirconium.

18. The method of claim 15, wherein:
   the thermal conductivity of the first refractory material is greater than the thermal conductivity of the second refractory material; and
   the oxide dispersion strengthened alloy comprises uni-axial grains oriented perpendicular to a plane of the bottom portion of the refractive container.

19. The method of claim 15, further comprising depositing a layer of the flux material onto the powdered superalloy material, such that:
   the flux material is a powdered flux material having an average particle size ranging from 0.02 mm to 0.08 mm; and
   a thickness of the layer of the flux material ranges from 3 mm to 20 mm.

* * * * *